United States Patent [19]

Hesse et al.

[11] Patent Number: 5,281,634

[45] Date of Patent: Jan. 25, 1994

[54] THICKENED, CURABLE MOLDING MATERIAL BASED ON A VINYL ESTER RESIN OR A VINYL ESTER URETHANE RESIN

[75] Inventors: Anton Hesse, Weinheim; Edwin Cramer, Ludwigshafen; Gerhard Georg, Ludwigshafen; Birgit Potthoff-Karl, Ludwigshafen, all of Fed. Rep. of Germany

[73] Assignee: BASF Aktiengesellschaft, Ludwigshafen, Fed. Rep. of Germany

[21] Appl. No.: 883,203

[22] Filed: May 14, 1992

[30] Foreign Application Priority Data

Jun. 13, 1991 [DE] Fed. Rep. of Germany ....... 4119434

[51] Int. Cl.$^5$ .................... C08L 67/00; C08K 3/22; C08K 3/10; C08K 5/04
[52] U.S. Cl. .................................... 523/514; 524/399; 524/432; 524/433; 524/436
[58] Field of Search ............... 523/514, 436; 524/399, 524/432, 433

[56] References Cited

U.S. PATENT DOCUMENTS

| 3,466,259 | 9/1969 | Jernigan | 523/211 |
| 3,718,714 | 2/1973 | Comstock et al. | 525/170 |
| 4,172,059 | 10/1979 | Atkins et al. | 523/514 |
| 4,287,116 | 9/1981 | Burns | 524/452 |
| 4,296,020 | 10/1981 | Magrans, Jr. | 523/521 |
| 4,525,498 | 6/1985 | Atkins et al. | 523/511 |
| 4,555,534 | 11/1985 | Atkins | 523/514 |
| 4,670,485 | 6/1987 | Hesse et al. | 523/522 |
| 4,777,195 | 10/1988 | Hesse et al. | 523/508 |
| 5,004,765 | 4/1991 | Atkins et al. | 523/523 |
| 5,047,455 | 10/1991 | Hesse et al. | 523/508 |
| 5,104,983 | 4/1992 | Stock et al. | 523/526 |

FOREIGN PATENT DOCUMENTS 0228922 7/1987 European Pat. Off. .

Primary Examiner—Paul R. Michl
Assistant Examiner—Peter Szekely
Attorney, Agent, or Firm—Oblon, Spivak, McClelland, Maier & Neustadt

[57] ABSTRACT

The invention relates to a curable, thickened molding material based on vinyl ester resins or vinyl ester urethane resins and containing a basic metal compound acting as thickening agent and also an acid group-containing thermoplastic vinyl polymer which is compatible with said resins.

27 Claims, No Drawings

THICKENED, CURABLE MOLDING MATERIAL BASED ON A VINYL ESTER RESIN OR A VINYL ESTER URETHANE RESIN

The invention relates to a curable molding material based on a vinyl ester resin or a vinyl ester urethane resin and thickened with a conventional thickening agent.

Vinyl ester resins and vinyl ester urethane resins do not normally contain any carboxyl groups and cannot therefore form viscosity-increasing ionomers with conventional thickening agents based on metal compounds such as magnesium oxide. Thus it is not usually possible to thicken such resins.

Attempts have therefore been made to thicken them by other means. According to U.S. Pat. No. 3,466,259, carboxyl groups are introduced into vinyl ester resins by reacting their secondary hydroxyl groups with dicarboxylic anhydrides. This requires an additional, expensive reaction stage, however. According to EP-A 228,922, vinyl ester resins and vinyl ester urethane resins are thickened by blending in isocyanates and primary aromatic amines. This method suffers from the drawback that it involves the use of moisture-sensitive substances.

It is thus an object of the invention to provide a simple and uncomplicated method of thickening vinyl ester resins and vinyl ester urethane resins which are free from carboxylic groups.

According to the invention, this object is achieved by blending the vinyl ester resin or vinyl ester urethane resin with from 0.5 to 15% w/w of an acid group-containing thermoplastic vinyl polymer which is compatible with the resin and has an acid number between 15 and 150 and a K-value between 15 and 60 and then thickening the resin by means of a conventional thickening agent based on a metal compound.

Accordingly, the invention relates to a curable, thickened molding material comprising A. 100 Parts by weight of a vinyl ester resin or vinyl ester urethane resin, B. from 0 to 120 parts by weight of an unsaturated polyester resin which is compatible with A, C. from 0.5 to 25 parts by weight of an acid group-containing thermoplastic vinyl polymer which is compatible with A and which has an acid number (determined acidimetrically as specified in DIN 53,402) of from 15 to 150 and a K-value (determined on a 1% solution in cyclohexanone as specified in DIN 51,562, Parts 1 and 3) of from 15 to 60, D. from 0.1 to 10 parts by weight of a basic metal compound acting as thickening agent, E. from 0.01 to 5 parts by weight of a polymerization initiator which decomposes at temperatures above 50° C., and F. from 0 to 400 parts by weight of fibrous reinforcement and/or filler.

U.S. Pat. No. 3,718,714 describes polyester resins (condensates of unsaturated dicarboxylic acids with polyols), which are capable of being thickened and contain from 1 to 60% w/w of a carboxyl group-containing polyvinyl acetate. This low-profile additive is incorporated with the intention of improving the surface properties of cured molded articles and is not concerned with any influence it might have on the thickening properties of the polyester resins, which is in any case irrelevant in this instance, since the said resins contain carboxyl groups and can be thickened without any difficulty.

The individual components are described in more detail below.

A. Vinyl ester resins and vinyl ester urethane resins are well known. They have in common that they contain vinyl ester end groups

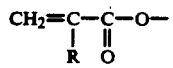

and are free from carboxyl groups. They are generally in admixture with up to 60 % w/w and preferably from 10 to 45% w/w of copolymerizable monomers to form a liquid reactive system. Resins which are free from monomers are also well suited for use within the scope of the present invention, but it will be necessary, in such cases, to use elevated temperatures when incorporating the thickening agent and during further processing without, however, initiating premature polymerization.

Vinyl ester resins, also called epoxide acrylates, are generally taken to mean reaction products of polyepoxides with unsaturated monocarboxylic acids, preferably methacrylic acid. These resins are described, for example, in GB-A 1,006,587 and in U.S. Pat. No. 3,066,112 and U.S. Pat. No. 3,179,623, the vinyl ester resins preferably used biding those based on bisphenol A. They are characterized by a high impact strength and good chemical resistance combined with a moderate deflection temperature. On the other hand, vinyl ester resins derived from, epoxy novolak resins and (meth)acrylic acid, as described in U.S. Pat. No. 3,256,226 for example, have a better deflection temperature but poorer impact strength.

Characteristic of all vinyl ester resins is the following group:

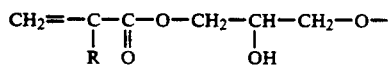

in which R denotes hydrogen or $CH_3$.

The epoxide resins used for the production of vinyl esters are derived from polyhydric phenols and alcohols. The epoxide equivalent weights may be between 60 and 2000. Preferred epoxide resins are glycidyl ethers based on bisphenol A and having epoxide equivalent weights of from 140 to 1000. Other groups of suitable polyepoxides comprise those based on bisphenol A and bisphenol F, 2,2-bis(4-hydroxycyclohexyl)propane and bis(4-hydroxycyclohexyl)methane respectively, hydrogenated in the nucleus, and epoxidized cycloolefins. Another important group of epoxide resins is formed by the polyglycidyl ethers of novolak resins. These include the condensates of phenol or cresol with aldehydes such as formaldehyde or butyraldehyde, and adducts of phenol or a substituted phenol with olefins such as dicyclopentadiene, isoprene, or norbornenes. The group of preferred epoxide resins also includes those derived from alkylene polyphenols, such as bis(4-hydroxyphenyl)methane, 1,1,2,2-tetrakis(4-hydroxyphenyl)ethane, or 1,1,3-tris(4-hydroxyphenyl)propane. Examples of epoxide resins based on polyhydric aliphatic alcohols are the polyglycidyl ethers of butane-1,4-diol, hexane-1,6-diol, trimethylolpropane, and polytetrahydrofuran.

Vinyl ester urethane resins are disclosed, for example, in U.S. Pat. No. 3,297,745, U.S. Pat. No. 3,772,404, U.S. Pat. No. 4,618,658, GB-A 2,217,722, and DE-A 3,744,390. In general, they have the following groups:

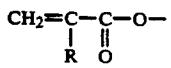

where R denotes hydrogen or $CH_3$,

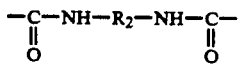 b)

where $R_2$ is a divalent aliphatic, aromatic, or cycloaliphatic radical of from 4 to 40 carbon atoms, preferably an aromatic radical of from 6 to 20 carbon atoms, possibly

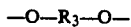 (c)

where $R_3$ is a divalent aliphatic, aromatic, or cycloaliphatic radical of from 2 to 500 carbon atoms, preferably an aliphatic radical of from 4 to 100 carbon atoms, and possibly

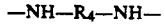 (d)

where $R_4$ is an aliphatic, cycloaliphatic, or aromatic radical of from 2 to 100 carbon atoms.

Preferably, the vinyl ester urethane resin is a reaction product derived from
a polyfunctional isocyanate,
possibly a polyhydric alcohol,
possibly a polyamine, and
a hydroxyalkyl (meth)acrylate,
during the reaction of which the ratio of isocyanate to (alcohol + amine) is from 100:0 to 100:300, by weight, and the ratio of equivalents of the hydroxyalkyl (meth)acrylate to the free isocyanate groups in the reaction product is from 3:1 to 1:2.

Polyisocyanates suitable for the preparation of the vinyl ester urethane resins are all known aliphatic, cycloaliphatic, and aromatic polyisocyanates containing at least two isocyanate groups in the molecule. Examples of suitable aliphatic isocyanates are hexamethylene diisocyanate, cyclohexane diisocyanate, isophorone diisocyanate, and dicyclohexymethane diisocyanate. The group comprising aromatic isocyanates includes, for example, diphenylmethane diisocyanate and diisocyanatotoluene and their isomer mixtures, polyphenyl-polymethylene-polyisocyanates (crude MDI), and diisocyanato-naphthalene. Triisocyanates can also be used, for example triisocyanato-toluene and triisocyanatodiphenylmethane, and trimerized, isocyanurate group-containing polyisocyanates based, for example, on hexamethylene diisocyanate or the mixture of isomers of diphenylmethane diisocyanate. Also suitable are urethane group-containing isocyanates formed by the reaction of polyhydric alcohols with isocyanates. Suitable polyhydric alcohols for this purpose are both short-chain alcohols such as ethanediol or glycerol and relatively long-chain compounds such as polyetherols and polyesterols. Preferred isocyanates are 4,4'-diphenylmethane diisocyanates and the mixture of isomers of 2,2'- and 4,4'-diphenylmethane diisocyanates.

Suitable polyhydric alcohols are the following: aliphatic diols such as ethane-1,2-diol, propane-1,2-diol, butane-1,4-diol, dipropylene glycol, neopentyl glycol, trimethylolpropane, and pentaerythritol; alicyclic diols such as hydrogenated bisphenol A, cyclohexanediol, cyclohexanedimethanol, and tricyclohexanedimethanol; phenols such as bisphenol A and resorcinol; alkoxylated derivatives of bisphenols such as bisphenol A, bisphenol S, and bisphenol F; aliphatic or aromatic polyetherols having a molecular weight not greater than 5,000, for example polyethylene glycol and polypropylene glycol; and polyesterols, both saturated and unsaturated hydroxy-terminated polyesters being suitable. The isocyanates may also be reacted with aminols, if desired, for example with ethanolamine, propanolamine, diethanolamine, triethanolamine, and aminophenols. We prefer to use dipropylene glycol, optionally in admixture with polypropylene glycol.

Suitable polyamines are both aliphatic and aromatic amines. Examples of suitable amines are the following: ethylenediamine, diethylenetriamine, bis(4-aminocyclohexyl)methane, diaminodiphenylmethane, and diaminodiphenylsulfone. Particularly suitable amines are long-chain amines with molecular weights between 150 and 5000. These include ether diamines such as 4,7-dioxadecane-1,10-diamine or compounds of the general formula

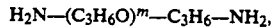

in which m is an integer from 2 to 80, or compounds of the general formula

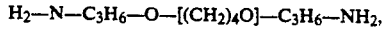

in which n is an integer from 5 to 80; also aminobenzoates and anthranilic acid esters of diols such as ethylene glycol, propylene glycol, polyethylene glycol, polypropylene glycol, polybutadiene glycol, polycaprolactone glycol, and polytetramethylene ether glycol. The particularly preferred aminobenzoates of polytetramethylene ether glycol have the following structure:

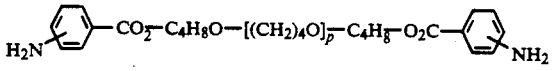

in which p is an integer from 5 to 80.

To form the terminal double bonds in the vinyl ester urethane, hydroxyalkyl (meth)acrylates are reacted with the isocyanate group-containing compounds. Hydroxyalkyl (meth)acrylates are represented by the following formula:

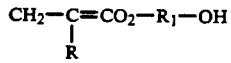

where R denotes hydrogen or $CH_3$ and $R_1$ is an alkylene group. These hydroxyalkyl (meth)acrylates are produced by reacting (meth)acrylic acid with alkylene oxides such as ethylene oxide or propylene oxide. Other suitable hydroxyalkyl (meth)acrylates for the purposes of the invention are glyceryl di(meth)acrylate, trimethylolpropane di(meth)acrylate, and pentaerythritol tri(meth)acrylate. Hydroxypropyl (meth)acrylate and hydroxyethyl (meth)acrylate are preferred.

There are various ways of producing the modified vinyl ester urethane resins. One method comprises the preliminary reaction of the isocyanate with the hydroxyalkyl (meth)acrylate followed, if required, by reaction with the polyhydric alcohol and/or polyamine. Alternatively, all reactants can be placed in a single vessel and reacted therein. A third possibility comprises mixing the isocyanate, polyol and polyamine and reacting these at a temperature of from 40° to 110° C. There is then added the amount of hydroxyalkyl (meth)acrylate required to saturate the isocyanate groups. The end of the reaction is indicated by the reduction in the number of isocyanate groups as ascertained either spectroscopically or by titration. Any excess polyisocyanate present reacts with the hydroxyalkyl (meth)acrylate to form a relatively low molecular weight vinyl ester urethane, and this can be utilized to adjust the viscosity of the resin. There is always formed a mixture of prepolymeric vinyl ester urethanes of various chain lengths and molecular weights.

Monomers which are suitable for inclusion in the vinyl ester resins or vinyl ester urethane resins are copolymerizable vinyl and allyl compounds. Preferred compounds are vinylbenzenes, especially styrene; esters of acrylic and methacrylic acids, for example methyl acrylate, ethyl acrylate, butyl acrylate, butanediol diacrylate, propylene glycol dimethacrylate, trimethylolpropane triacrylate, and methyl methacrylate; allyl compounds such as diallyl phthalate, diallyl ether, allylphenols, and allylphenol ethers; vinylpyridine and vinylpyrrolidone.

B. The unsaturated polyester resins are generally in the form of solutions of from 80 to 40% w/w of unsaturated polyester in from 20 to 60% w/w of copolymerizable monomer. The polyesters are condensates of polycarboxylic acids, particularly dicarboxylic acids, and their esterifiable derivatives, especially their anhydrides, bonded in ester-like fashion with polyhydric, particularly dihydric, alcohols and possibly containing additional radicals of monocarboxylic acids or monohydric alcohols, whilst at least a portion of the components must provide ethylenically unsaturated copolymerizable groups.

Examples of copolymerizable monomers are again the usual allyl and vinyl compounds, preferably styrene.

The acid number of the unsaturated polyester resin should be below 100 and is preferably between 0 and 50. Particular preference is given to polyester resins of 1) maleic acid optionally together with o-phthalic acid, and 2) a diol such as dipropylene glycol, diethylene glycol, and/or propane-1,2-diol, all dissolved in styrene.

The unsaturated polyester resin B must be compatible with the vinyl ester resin or vinyl ester urethane resin A. It is present in the molding material of the invention in a concentration of from 0 to 120, preferably from 5 to 100, parts by weight, per 100 parts by weight of A. It improves the compatibility between the vinyl ester resin or vinyl ester urethane resin A and the thickening agent C. If the unsaturated polyester resin is omitted, there is a risk, in some cases, of a layer of liquid forming on the thickened molding material, which liquid consists mainly of monomer.

C. The molding material of the invention contains, per 100 parts by weight of A, from 0.5 to 25, preferably from 1 to 15, parts by weight of an acid group-containing thermoplastic vinyl polymer which is compatible with A) and which has an acid number of from 15 to 150, preferably from 25 to 80, and a K-value of from 15 to 60, preferably from 20 to 40.

Suitable vinyl polymers are, for example, copolymers of vinyl esters such as vinyl acetate and vinyl propionate with unsaturated organic acids such as crotonic acid, acrylic acid, methacrylic acid, maleic acid, maleic half-esters, and vinylsulfonic acids. Corresponding copolymers of other vinyl monomers such as vinyl pyrrolidone, vinyl caprolactam, methyl methacrylate, t-butyl acrylate, and styrene with unsaturated acids may be used. Also suitable are block copolymers and graft copolymers of thermoplastic vinyl polymers with the said unsaturated acids, and partially hydrolyzed polyvinyl esters.

D. The molding material contains, per 100 parts by weight of A, from 0.1 to 10, preferably from 0.5 to 8, parts by weight of a conventional thickening agent based on a basic metal compound. Preferred agents are oxides, hydroxides, alcoholates, and salts of metals in Groups I to III, in particular MgO, $Mg(OH)_2$, CaO, $Ca(OH)_2$, BaO, $Li_2O$, LiOH, Mg and Al alcoholates, Al ethylhexanoate, and Al benzoate. Some transition metal compounds are also suitable, for example ZnO.

As in the case of unsaturated polyester resins, thickening can be accelerated by the addition of polar compounds, for example by means of hydroxyl compounds such as water, propylene glycol, and glycerol, by means of carboxylic acids and their anhydrides, such as benzoic acid, cyclohexanoic acid, and hexahydrophthalic anhydride, and by means of halides such as choline chloride and lithium halides.

E. The polymerization initiators used are the conventional peroxides which decompose at temperatures above 50° C. to form free radicals. Their half-life at 50° C. should preferably not be longer than 100 hours. Examples of suitable peroxides are diacylperoxides, peroxydicarbonates, peroxyesters, perketals, ketone peroxides, hydroperoxides, and dialkylperoxides. The following are examples of suitable compounds: succinylperoxide, diacetyl peroxide, benzoylperoxide, t-butyl peroctoate, p-chlorobenzoylperoxide, t-butyl per-isobutyrate, 3,5,5-trimethylcyclohexanone perketal, 2,5-dimethylhexane-2,5-diperbenzoate, t-butyl peracetate, t-butyl per-isononanate, di-t-butyl-diperphthalate, 2,2-bis(t-butylperoxy)butane, t-butyl perbenzoate, dicumylperoxide, 2,5-dimethyl-2,5-bis(t-butylperoxy)hexane, t-butylhydroperoxide, cumene hydroperoxide, di-t-butylperoxide, 2,5-dimethyl-2,5-bis-(t-butylperoxy)hexyne, 1,1,4,4,7,7-hexamethyl-cyclo-4,7-diperoxynonane, diamylperoxide, t-butyl perethylhexanoate, dilauroylperoxide, t-butylcumylperoxide, γ-t-butylperoxyvalerolactone, dimyristyl peroxydicarbonate, and bis(4-t-butylcyclohexyl) peroxydicarbonate. Compounds having unstable C-C bonds and azo compounds are also suitable. Initiators which decompose below 50° C. are not suitable. They shorten the shelf life of the molding material by causing premature gelling thereof. An example of such an initiator is acetylacetone peroxide. The so-called cold-curing systems likewise suffer from an inadequate shelf life.

The polymerization initiators are added in amounts ranging from 0.01 to 5, preferably from 0.5 to 3, parts by weight, per 100 parts by weight of A.

F. Reinforcing fibers which may be used are any of the conventional inorganic and organic fibers such as fibers of glass, carbon, cellulose, polyethylene, polycarboxylates, or polyamide. They may be in the form of short fibers having a length of not more than $5^{cm}$, or of milled fibers, but use is preferably made of long fibers in the form of individual rovings, webs of parallel rovings, fiber mats, and non-woven, woven, or knitted fabrics.

The fibers are used in amounts ranging from 0 to 400% w/w, preferably from 30 to 350% w/w, based on A. In the case of glass fiber mats, the particularly preferred glass content is from 100 to 300% w/w, based on A, in the case of rovings it is from 30 to 150% w/w, and in the case of unidirectional webs it is from 150 to 350% w/w.

Examples of suitable fillers are conventional finely ground or granular fillers such as chalk, kaolin, quartz powder, dolomite, heavy spar, powdered metal, aluminum oxide hydrate, cement, talcum, kieselguhr, wood meal, wood chips, pigments, and the like. The concentration of such fillers is preferably in the range of 5 to 300% w/w, based on A.

G. Other suitable additives are conventional inhibitors, especially phenols, quinones, or nitroso compounds; lubricants such as waxes or paraffins to prevent surface evaporation; flame retardants; and release agents.

The molding materials of the invention are thickened, tack-free, uncrosslinked materials which are stable on storage and which may be in the form of sheet, pastes, or granules. Their viscosity together with 150 parts of calcium carbonate (Millicarb ®) per 100 parts of A+B at 23° C. should be at least 500,000 mPa.s and preferably at least 4,000,000 mPa.s, as measured with a Brookfield viscosimeter.

At lower viscosities, the materials can no longer be regarded as being tack-free and processing becomes problematic. The viscosity is preferably between $2 \cdot 10^6$ and $200 \cdot 10^6$ mPa.s. Above $200 \cdot 10^6$ mPa.s, the materials are solid and hard, so that processing again becomes difficult to carry out. Such hard materials can, though, be processed if the temperature is raised, but this involves the risk of premature cross-linking.

By 'uncrosslinked' we mean that no three-dimensional network of molecules involving atomic linkage may be present. In practice, the degree of crosslinking can be determined by attempting to dissolve the molding material in a suitable organic solvent, preferably dimethyl formamide, dimethyl sulfoxide, or acetone, possibly with heating. This test should give insoluble residues of not more than 10% w/w and preferably of less than 1% w/w of said material, disregarding, of course, any fibrous reinforcement or fillers present.

By 'stable on storage' we mean that the molding material must remain uncrosslinked, i.e. soluble as defined above, after storage for one day at room temperature. The molding materials of the invention are preferably storable for longer periods, say for more than 30 days.

A preferred method of manufacturing the molding materials of the invention comprises blending the constituents A, B. C, E, F, and G (with the exception of long reinforcing fibers) and adding component D at a temperature below 50° C. to initiate the thickening process. The material may, while still in a free-flowing state, be applied if desired to reinforcing fibers, after which thickening will be allowed to continue to completion. It may in some cases be advantageous to heat the material for a short period to a temperature below 100° C. and preferably below 50° C., in order to accelerate the thickening process. It may take several days for thickening to reach completion, but it is preferred that it be virtually complete in less than one day.

Presumably, when the thickening agent D is added, it reacts with the acid groups of the vinyl polymer C to form an ionomer which is incompatible with the resinous system and thus separates therefrom to effect an increase in viscosity. Unlike the thickening of conventional unsaturated polyester resins, that achieved here involves a comparatively quick rise in viscosity after the addition of the thickening agent and the viscosity remains virtually constant after reaching its peak value.

The thickened molding materials may be stored for relatively long periods before they are processed. For example, they can be stored in the form of stacks of coiled bales or in the form of packages. The molding materials can be processed by compression molding, transfer molding, injection molding, and deep drawing, and curing is effected at temperatures above 50° C., preferably between 80° and 200° C. and more preferably between 120° and 180° C.

In the following Examples, the parts and percentages are by weight.

EXAMPLES

Preparation of Vinyl Ester Resin

A1) 240 Parts of bisphenol A diglycidyl ether Epikote 828 (Shell) were blended with 580 parts of bisphenol A diglycidyl ether Epikote 1001 (Shell) at 95° C. To this melt there were then added 1 part of hydroquinone and 2 parts of benzyltributylammonium chloride, and the mixture was allowed to react with 200 parts of methacrylic acid at 115° C. When the acid number fell below 6, the melt was dissolved in styrene to form a 60% solution, which was stabilized with 450 ppm of hydroquinone.

A2) To 1520 parts of bisphenol A diglycidyl ether Epikote 828 (Shell), 0.72 part of dimethylhydroquinone, and 1.80 parts of dimethylbenzylamine there were added 688 parts of methacrylic acid at 85° C. over a period of 45 minutes, during which time the temperature rose to 110° C. After five hours the acid number reached a value of 16.2, and the melt was dissolved in 1472 parts of styrene.

A3) 600 parts of bisphenol A diglycidyl ether Epikote 828 (Shell), 1200 parts of novolak epoxide resin Eposid 5038 (Duroplast-Chemie), 2 parts of hydroquinone, and 10 parts of benzyltributylammonium chloride were taken, and 790 parts of methacrylic acid were added thereto at 90° C. over a period of one hour, during which time the temperature rose to 110° C. Following a reaction time of 4 hours, the melt was dissolved in 1360 parts of styrene and stabilized with 1 part of hydroquinone.

Preparation of Vinyl Ester Urethane Resins

A4) 130 Parts of 4,4'-diphenylmethane diisocyanate (Lupranat MS, BASF AG) were dissolved in 90 parts of styrene at 50° C. There was then added 0.3 part of dibutyltin dilaurate, after which 12 parts of polytetrahydrofuran dissolved in 34 parts of styrene were added to this reaction mixture. After 10 minutes, 14 parts of dipropylene glycol were added at 50° C. and stirring was continued for 15 minutes. 120 Parts of hydroxypropyl methacrylate were then metered to the solution at from 50° to 60° C., and the solution was stabilized with 0.1 part of hydroquinone. 10 Parts of styrene were added.

A5) 372 Parts of diisocyanate prepolymer based on 4,4'-diphenylmethane diisocyanate (Lupranat MP 102, 23% NCO, BASF AG), 0.22 part of hydroquinone monomethyl ether, and 0.55 part of dibutyltin dilaurate were dissolved in 451 parts of styrene, and 304.5 parts of hydroxypropyl methacrylate were added to the solution over a period of 20 minutes. The exothermic reaction was controlled by cooling such that the temperature of the mixture did not exceed 55° C. Stirring was continued for 2 hours at 55° C., after which the mixture was stabilized with 0.11 part of dimethylhydroquinone.

A6) 250 Parts of 4,4'-diphenylmethane diisocyanate were dissolved in 364 parts of styrene, and to this solution there were added 0.27 part of dibutyltin dilaurate and 0.11 part of hydroquinone monomethyl ether, after which 296 parts of hydroxypropyl methacrylate were added dropwise at room temperature over a period of one hour. The temperature of the reaction solution was maintained at 60° C. for four hours with the aid of a water bath.

Preparation of Polyester Resins

B1) An unsaturated polyester having an acid number of 29 and a melt viscosity at 125° C. of 740 mPa.s was produced by condensing maleic anhydride with dipropylene glycol (molar ratio 1:1) at a temperature of from 185° to 200° C. It was dissolved in styrene to form a 60% solution, which was stabilized with 120 ppm of hydroquinone.

B2) An unsaturated polyester having an acid number of 45 was produced from maleic anhydride, tetrahydrophthalic anhydride and diethylene glycol in a molar ratio of 1:0.5:1.5. It was dissolved in styrene to form a 65% solution and was stabilized with 120 ppm of hydroquinone.

B3) An unsaturated polyester having an acid number of 30 was produced in a two-stage process in which, in the first stage, equimolar amounts of dicyclopentadiene and maleic acid were reacted at from 125° to 135° C. to form the maleic acid half-ester, which was condensed with ethylene glycol at 190° C. in the second stage. The reactants were used in a molar ratio of maleic acid to dicyclopentadiene to ethylene glycol of 1:1:0.55. The unsaturated polyester was dissolved in styrene to form a 68% solution therein and was stabilized with 85 ppm of hydroquinone.

B4) An unsaturated polyester having an acid number of 31 was produced by reacting maleic anhydride and propylene glycol in a molar ratio of 1:1.03. It was dissolved in styrene to form a 65% solution, which was stabilized with 120 ppm of hydroquinone.

Preparation of Vinyl Polymers

C1) Terpolymer of
20% of vinylpyrrolidone
70% of t-butyl acrylate
10% of methacrylic acid The terpolymer was prepared by solution polymerization in ethanol at 78° C. over a period of 6 hours, during which time the monomers and 0.8% of t-butyl perpivalate were separately metered to the polymerization vessel. On completion of the reaction, the solvent was removed in vacuo and the residues were dissolved in styrene and stabilized with 100 ppm of hydroquinone and 200 ppm of dimethylquinone.

The resulting terpolymer had a K-value of 25.6 (as measured on a 1% solution in ethanol) and an acid number of 65.

40 Parts of the terpolymer were dissolved in 60 parts of styrene. The viscosity of this solution at 23° C. was 111,600 mPa.s.

C2 to C5)

The polymers C2 to C5 were prepared by suspension polymerization in water at about 90° C., 0.7% of t-butyl peroctoate being used as initiator and mercaptoethanol as chain stoppage regulator. On completion of the polymerization, the mixture was subjected to steam distillation and the particles of polymer were isolated in the form of beads, which were dried and dissolved in styrene at about 80° C. Stabilization was effected with 100 ppm of dimethylquinone. Table 1 below shows the composition of the polymers, their properties, and the styrene contents and viscosities of the solutions.

TABLE 1

| Polymer | Composition % | K-Value | Acid Number | Styrene Content % | Viscosity (23° C.) mPa·s |
|---|---|---|---|---|---|
| C2 | 93.6 vinyl acetate 6.4 crotonic acid | 29.7 | 45 | 60 | 958 |
| C3 | 90 vinyl acetate 10 crotonic acid | 36 | 66 | 75 | 7557 |
| C4 | 50 vinyl acetate 40 vinyl propionate 10 crotonic acid | 36 | 66 | 60 | 7570 |
| C5* | 98.8 vinyl acetate 1.2 crotonic acid | 35 | 7.5 | 60 | 805 |

*for comparison

Production of Molding Materials a) In order to examine the thickening behavior of the liquid reactive resins, 100 parts of a mixture of resins A and B and a solution of polymer C were mixed with 100 parts of chalk filler (Millicarb ®) and 3.75 parts of magnesium oxide paste (Luvatol MK 3 5, 35% solution in MgO, Lehmann & Voss) using a high-speed stirrer. The specimens were hermetically sealed and stored at 23° C. and changes in viscosity of the molding materials with time were measured, using a Brookfield viscosimeter HBT-D, model DV-II. Table 2 below shows that the preparations of the invention experience a very rapid rise in viscosity until a flat peak (within the limits of measuring accuracy) is reached. The Comparative Examples 4 and 5 not modified with polymers of the invention do not give tack-free products, because the viscosity of the pastes changes only slightly in the presence of magnesium oxide.

TABLE 2

| Test No. | 1 | 2 | 3 | 4* | 5* | 6 | 7 | 8 | 9 | 10 | 11 | 12 | 13 | 14 |
|---|---|---|---|---|---|---|---|---|---|---|---|---|---|---|
| Parts of: | | | | | | | | | | | | | | |
| Resin A4 | 74 | 72 | 60 | 80 | 70 | | | | | | | | 40 | |
| Resin A5 | | | | | | 64 | | | | | | | | |
| Resin A1 | | | | | | | 74 | 74 | 74 | 64 | | 36 | 40 | 76 |
| Resin A3 | | | | | | | | | | | 72 | 36 | | |

TABLE 2-continued

| Test No. | 1 | 2 | 3 | 4* | 5* | 6 | 7 | 8 | 9 | 10 | 11 | 12 | 13 | 14 |
|---|---|---|---|---|---|---|---|---|---|---|---|---|---|---|
| Resin B1 | 16 | 18 | 15 | 20 | 30 | 16 | 16 | 16 | 16 | 16 | | | | |
| Resin B2 | | | | | | | | | | | 18 | 18 | 10 | 5 |
| Polymer C1 | | | | | | | 4 | | | | | | | |
| Polymer C2 | | 4 | 10 | | | 8 | | | | | 4 | 4 | 4 | 7.6 |
| Polymer C3 | | | | | | | | | 2.5 | 5 | | | | |
| Polymer C4 | 4 | | | | | | | 4 | | | | | | |
| Viscosity after storage at 23° C. [mPa · s] × 10$^6$ for: | | | | | | | | | | | | | | |
| 1 day | 54.2 | 18.2 | 129 | 0.05 | 0.07 | 63.6 | 4.1 | 34.8 | 44.6 | 127 | 14.7 | 23.6 | 31.6 | 33.2 |
| 7 days | 57.4 | 51.3 | 128 | 0.13 | 0.64 | — | 22.0 | 44.8 | 56.8 | 137 | 53.6 | 78.2 | 47.6 | 56.6 |
| 14 days | 57.2 | 59.2 | 124 | 0.20 | 1.44 | 108 | 23.6 | 44.3 | 58.4 | 138 | 75.8 | 79.2 | 45.2 | 55.2 |
| 21 days | 61.4 | 64.2 | | 0.23 | 2.44 | 104 | 31.4 | 44.1 | 58.2 | 136 | — | 80.2 | 46.1 | 62.3 |
| 28 days | 61.6 | 59.0 | | | 2.99 | 108 | | 41.2 | 58.0 | 133 | 64.6 | 82.8 | 58.6 | 62.3 |

*for comparison b) In order to compare the thickening behavior of the reactive systems of the invention with that of systems based on polymers of low acid number, such as are conventionally used in low-shrink systems, 100 parts of a mixture of resin A6 and polymer solution C2 or C5 and mixtures of vinyl urethane resin A6, unsaturated polyester resin B3 and the said polymer solutions with 120 parts of Millicarb ® chalk were stirred vigorously while 3.75 parts of the MgO paste Luvatol MK 35 were added. The specimens were hermetically sealed and stored at room temperature, and the change of viscosity with time was recorded.

Table 3 below provides information on the composition of the reactive resins and on the viscosity changes occurring during storage. The results clearly indicate the superiority of the reactive systems of the invention (Examples 15 and 17). Whilst it takes only one to two days for these to provide tack-free, firm molding materials when thickened with MgO, the comparative systems (Examples 16 and 18) remain tacky to viscous after a period of 30 days under the same conditions.

TABLE 3

| Test No. | 15 | 16* | 17 | 18* |
|---|---|---|---|---|
| Parts of resin A6 | 80 | 80 | 40 | 40 |
| Parts of resin B3 | | | 40 | 40 |
| Parts of polymer C2 | 8 | | 8 | |
| Parts of polymer C5 | | 8 | | 8 |
| Viscosity on storage at 23° C. [mPa · s · 10$^6$] after | | | | |
| 1 day | 29 | 0.9 | 14.6 | 0.20 |
| 7 days | 42.8 | 5.8 | 72.0 | 0.51 |
| 14 days | 40.2 | 9.5 | 81.2 | 0.65 |
| 21 days | 38.3 | 13.1 | 89.6 | 1.20 |
| 28 days | 42.2 | 14.0 | 106.0 | 1.30 |
| Consistency of the molding material: | firm dry | tacky | firm dry | tacky viscous |

*for comparison c) Manufacture and Processing of Sheet Molding Compounds c1) A resin/filler blend was formed from the following constituents in a high-speed mixer:

```
64   parts of resin A4
16   parts of resin B1
 8   parts of polymer C2 in 12 parts of styrene
 1.5 parts of t-butyl perbenzoate
 4.5 parts of zinc stearate
 3.0 parts of amorphous silicic acid (Aerosil 200, Degussa)
 0.03 part of p-benzoquinone
100  parts of chalk filler (Millicarb ®)
 4.0 parts of Luvatol MK 35 (MgO paste)
```

This blend was processed on experimental SMC equipment to give a sheet of intermediate product containing 38% of chopped glass rovings (length 2.5 cm), and this was stored for 4 days at 23° C. between sealing films of polyethylene. On removal of the sealing films, the tack-free intermediate was compression molded in a heated sheet mold of polished steel (dimensions: 0.4×58×25 cm) for 5 minutes at 145° C. under a pressure of 80 bar. This gave a cured molding compound having a smooth shiny surface and the following properties:

| Modulus in flexure (DIN 53,457) | 13.7 kN/mm$^2$ |
|---|---|
| Flexural strength (DIN 53,452) | 265 N/mm$^2$ |
| Elongation of skin fibers (DIN 53,452) | 2.8% |
| Impact strength (DIN 53,453) | 119 kJ/m$^2$ | c2) A resin/filler blend was formed from the following constituents in a high-speed mixer:

```
72   parts of resin A2
18   parts of resin B2
 4   parts of polymer C2
 1.5 parts of t-butyl perbenzoate
 4.5 parts of zinc stearate
 3.0 parts of amorphous silicic acid (Aerosil ®)
 0.03 part of p-benzoquinone
100  parts of chalk filler (Millicarb ®)
 3.5 parts of Luvatol MK 35 (MgO paste)
```

This blend was processed on experimental SMC equipment to give a sheet molding compound containing 27.5% of chopped glass rovings (length 2.5 cm), and this was stored for 7 days at 23° C. between films of polyethylene. On removal of the sealing films, the tack-free intermediate was compression molded in a heated sheet mold of polished steel (dimensions: 0.4×58×25 cm) for 5 minutes at 145° C. under a pressure of 80 bar. This gave a cured molding compound having a smooth shiny surface and the following properties:

| Modulus in flexure (DIN 53,457) | 12.3 kN/mm$^2$ |
|---|---|
| Flexural strength (DIN 53,452) | 209 N/mm$^2$ |

-continued

| | |
|---|---|
| Elongation of skin fibers (DIN 53,452) | 2.56% |
| Impact strength (DIN 53,453) | 85 kJ/m² | d) The following blend was created for the purpose of determining the crack toughness of a molding compound of the invention:

```
64 parts of resin A4
16 parts of resin B1
 8 parts of polymer C2 in 12 parts of styrene
1.5 parts of t-butyl perbenzoate
3.75 parts of Luvatol MK 35 (MgO paste)
```

This blend was poured into a sheet mold (0.4×21×21 cm), stored therein for 3 days at 23° C. and then cured for 3 hours at 80° C. followed by 16 hours at 125° C.

For the purposes of comparison, the resin A4, which cannot be thickened with magnesium oxide alone, was blended with initiator as listed below and cured for 3 hours at room temperature and then tempered at 125° C. for 16 hours:

```
100 parts of resin A4
  2 parts of methylethyl ketone LA3
  1 part of Co accelerator (containing 1% of Co++)
  1 part of t-butyl perbenzoate
```

The cured molding compound measured 0.4×21×21 cm.

The fractured toughness of the two molding compounds was determined as specified in ASTM E-399. The results are given in Table 4 below.

TABLE 4

| Molding Compound: | Invention | Comparison |
|---|---|---|
| $K_{IC}$ [Mpa · m$^{\frac{1}{2}}$] | 1.180 | 0.701 |
| $G_{IC}$ [J · m$^{-2}$] | 362.15 | 122.58 |
| Modulus in flexure [N/mm²] | 3840 | 4035 |

We claim:

1. A curable, thickened molding material, comprising
A. 100 parts by weight of a vinyl ester resin,
B. from 0 to 120 parts by weight of an unsaturated polyester resin which is compatible with A,
C. from 0.5 to 25 parts by weight of an acid group containing thermoplastic vinyl polymer which is compatible with A and which has an acid number (determined as specified in DIN 53,402) of from 15 to 150 and a K-value (determined as specified in DIN 51,562, Parts 1 and 3) of from 15 to 60,
D. from 0.1 to 10 parts by weight of a basic metal compound acting as thickening agent,
E. from 0.01 to 5 parts by weight of a polymerization initiator which decomposes at temperatures above 50° C., and
F. from 0 to 400 parts by weight of fibrous reinforcement and/or filler.

2. A molding material as claimed in claim 1, wherein the vinyl ester resin A contains vinyl ester end groups of the formula:

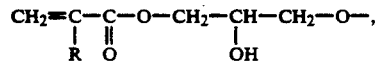

in which R denotes hydrogen or CH₃, and is free from carboxyl groups.

3. A molding material as claimed in claim 1, wherein the vinyl ester resin A is in the form of a liquid reactive system in which it is mixed with up to 60% w/w of a copolymerizable monomer.

4. A molding material as claimed in claim 1, wherein the component A is a vinyl ester resin which contains the group $$CH_2\!=\!C\!-\!C\!-\!O\!-\!CH_2\!-\!CH\!-\!CH_2\!-\!O\!-,$$
$$\phantom{CH_2\!=\!}\overset{|}{R}\ \overset{\|}{O}\qquad\ \overset{|}{OH}$$

in which R denotes hydrogen or CH₃.

5. A curable, thickened molding material, comprising:
A. 100 parts by weight of a vinyl ester urethane resin,
B. from 0 to 120 parts by weight of an unsaturated polyester resin which is compatible with A,
C. from 0.5 to 25 parts by weight of an acid group-containing thermoplastic vinyl polymer which is compatible with A and which has an acid number (determined as specified in DIN 53,402) of from 15 to 150 and a K-value (determined as specified in DIN 51,562, Parts 1 and 3) of from 15 to 60,
D. from 0.1 to 10 parts by weight of a basic metal compound acting as thickening agent,
E. from 0.01 to 5 parts by weight of a polymerization initiator which decomposes at temperatures above 50° C., and
F. from 0 to 400 parts by weight of fibrous reinforcement and/or filler.

6. A process for the preparation of a molding material as claimed in claim 1, wherein the components A, B, C, E, and F are mixed together, and the component D is added thereto at a temperature below 50° C. to initiate the thickening process, the resulting material is applied if desired to reinforcing fibers, while still in a free-flowing state, after which thickening is allowed to continue to completion, if necessary with heating.

7. A method of manufacturing molded articles comprising, compression molding, transfer molding, injection molding, or deep drawing, the molding material of claim 1, followed by curing at temperatures above 50° C.

8. A molding material as claimed in claim 5, wherein the component A is a vinyl urethane resin which contains the following groups:

 a)

where R denotes hydrogen or CH₃,

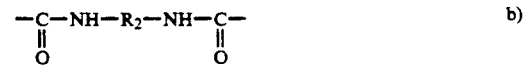 b)

where R₂ is a divalent radical of from 4 to 40 carbon atoms, possibly $$-O-R_3-O- \quad (c)$$

where $R_3$ is a divalent radical of from 2 to 500 carbon atoms, and possibly $$-NH-R_4-NH- \quad (d)$$

where $R_4$ is a divalent radical of from 2 to 100 carbon atoms.

9. The molding material of claim 5, wherein said vinyl ester urethane resin A contains vinyl ester end groups of the formula:

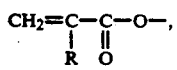

in which R denotes hydrogen or $CH_3$, and is free from carboxyl groups.

10. The molding material of claim 5, wherein said vinyl ester urethane resin A is in the form of a liquid reactive system in which it is mixed with up to 60% w/w of a copolymerizable monomer.

11. A process for the preparation of a molding material as claimed in claim 5, wherein the components A, B, C, E, and F are mixed together, and the component D is added thereto at a temperature below 50° C. to initiate the thickening process, the resulting material is applied if desired to reinforcing fibers, while still in a free-flowing state, after which thickening is allowed to continue to completion, if necessary with heating.

12. A method of manufacturing a molded article comprising compression molding, transfer molding, injection molding, or deep drawing the molding material of claim 8, followed by curing at temperatures above 50° C.

13. The molding material of claim 1, further comprising conventional additives.

14. The molding material of claim 5, further comprising conventional additives.

15. The molding material of claim 1, wherein said material has a Brookfield viscosity at 23° C. of from $5 \times 10^5 - 200 \times 10^6$ mPa.s.

16. The molding material of claim 5, wherein said material has a Brookfield viscosity at 23° C. of from $5 \times 10^5 - 200 \times 10^6$ mPa.s.

17. The molding material of claim 1, wherein said acid group-containing thermoplastic vinyl polymer has an acid number of from 25 to 150.

18. The molding material of claim 5, wherein said acid group-containing thermoplastic vinyl polymer has an acid number of from 25 to 150.

19. The molding material of claim 1, wherein component A further comprises a vinyl ester urethane resin.

20. The molding material of claim 3, wherein the vinyl ester resin A is in the form of a liquid reactive system in which it is mixed with from 10-45% w/w of a copolymerizable monomer.

21. The method of claim 7, wherein said curing is at a temperature between 80°-200° C.

22. The molding material of claim 10, wherein said vinyl ester urethane resin A is in the form of a liquid reactive system in which it is mixed with from 10-45% w/w of a copolymerizable monomer.

23. The method of claim 12, wherein said curing occurs at a temperature from between 80°-200° C.

24. The molding material of claim 15, wherein said material has a Brookfield viscosity at 23° C. of from $2 \times 10^6 - 200 \times 10^6$ mPa.s.

25. The molding material of claim 16, wherein said material has a Brookfield viscosity at 23° C. of from $2 \times 10^6 - 200 \times 10^6$ mPa.s.

26. The molding material of claim 17, wherein said acid group-containing thermoplastic polyvinyl polymer has an acid number of from 25 to 80.

27. The molding material of claim 18, wherein said acid group-containing thermoplastic vinyl polymer has an acid number of from 25 to 80.

* * * * *